United States Patent
Kircher et al.

(10) Patent No.: US 9,403,465 B2
(45) Date of Patent: Aug. 2, 2016

(54) CREW REST COMPARTMENT AND MEANS OF TRANSPORT

(71) Applicant: Airbus Operations GmbH, Hamburg (DE)

(72) Inventors: Benedikt Kircher, Hamburg (DE); Stephan Sontag, Revenahe (DE); Paul Edwards, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/231,815

(22) Filed: Apr. 1, 2014

(65) Prior Publication Data

US 2014/0298582 A1    Oct. 9, 2014

(30) Foreign Application Priority Data

Apr. 4, 2013  (EP) ..................................... 13162361

(51) Int. Cl.
| | |
|---|---|
| *B64D 11/00* | (2006.01) |
| *B60N 3/00* | (2006.01) |
| *B60P 3/38* | (2006.01) |
| *B63B 29/10* | (2006.01) |

(52) U.S. Cl.
CPC . *B60N 3/008* (2013.01); *B60P 3/38* (2013.01); *B64D 11/00* (2013.01); *B63B 29/10* (2013.01); *B64D 2011/0076* (2013.01)

(58) Field of Classification Search
CPC ....................................................... B64D 11/00
USPC .............. 5/2.1, 89.1, 9.1, 8; 244/118.1, 118.5
See application file for complete search history.

(56) References Cited

U.S. PATENT DOCUMENTS

| | | | | |
|---|---|---|---|---|
| 5,784,836 | A  * | 7/1998 | Ehrick ................... | B64D 11/00 |
| | | | | 244/118.5 |
| 7,156,344 | B1 * | 1/2007 | Guering ..................... | 244/118.5 |
| 2002/0033432 | A1 * | 3/2002 | Mikosza ................... | 244/118.6 |
| 2002/0070314 | A1 * | 6/2002 | Schmidt-Schaeffer .... | 244/118.6 |
| 2006/0284013 | A1 | 12/2006 | Guering | |
| 2008/0073463 | A1 | 3/2008 | Guering | |
| 2009/0308973 | A1 * | 12/2009 | Guering ......................... | 244/58 |
| 2010/0140400 | A1 | 6/2010 | Helfrich et al. | |
| 2010/0252679 | A1 | 10/2010 | Sutthoff et al. | |
| 2011/0114789 | A1 | 5/2011 | Ergenci et al. | |
| 2011/0154567 | A1 | 6/2011 | Amstutz et al. | |

FOREIGN PATENT DOCUMENTS

| | | | |
|---|---|---|---|
| DE | 10 2008 035 375 A1 | 2/2010 | |
| WO | 2010/012753 A2 | 2/2010 | |

OTHER PUBLICATIONS

European Search Report (EP 13162361.3)(dated Sep. 4, 2013).

* cited by examiner

*Primary Examiner* — Fredrick Conley
(74) *Attorney, Agent, or Firm* — Lerner, David, Littenberg, Krumholz & Mentlik, LLP

(57) ABSTRACT

A crew rest compartment for a means of transport includes a first bunk and a second bunk, wherein the first bunk is located above the second bunk. Each bunk includes a sleeping area for accommodating a sleeping crew member, wherein each sleeping area has a longitudinal direction. The first bunk is aligned such that the longitudinal direction of the first bunk and a longitudinal direction of the crew rest compartment enclose an angle which differs from 0° and 90°.

19 Claims, 8 Drawing Sheets

CREW REST COMPARTMENT AND MEANS OF TRANSPORT

FIELD OF THE INVENTION

The invention relates to a crew rest compartment of a means of transport and to a means of transport comprising a crew rest compartment. In particular, the crew rest compartment comprises a first bunk and a second bunk, wherein a longitudinal direction of the first bunk and a longitudinal direction of the crew rest compartment enclose an angle which differs from 0° and 90°.

BACKGROUND OF THE INVENTION

Currently, the known configurations of crew rest facilities, for example for an aircraft, feature bunks that are oriented parallel or perpendicular to the flight direction. The usable space in these crew rest compartments may be laid out in a rectangular design and may comprise some volume which cannot be used. For example, in a corner of a bed, the additional space which is not used by the crew member might not be used for other means.

DE 10 2008 035 375 A1 relates to a unit for accommodation of an aircraft crew member comprising a facility for the member to lie down.

WO 2010/012753 A2 discloses an accommodation unit adapted for being arranged in a crew rest compartment in an aircraft. The accommodation unit includes at least one bed for the member of the aircraft to lie down.

BRIEF SUMMARY OF THE INVENTION

According to an embodiment of the invention, a crew rest compartment of a means of transport is provided. Said crew rest compartment comprises a first bunk and a second bunk wherein the first bunk and the second bunk each comprise a sleeping area adapted for accommodating a sleeping crew member. Furthermore, each sleeping area has a longitudinal direction and each longitudinal direction of each sleeping area defines a longitudinal direction of the corresponding bunk. Moreover, the first bunk is located above the second bunk. The longitudinal direction of the first bunk and a longitudinal direction of the crew rest compartment enclose an angle which differs from 0° and 90°. Said longitudinal direction of the crew rest compartment is defined to be parallel to the longitudinal direction of the means of transport when the crew rest compartment is mounted in the means of transport.

For example, the means of transport refers to an aircraft, a train, a bus, a submarine, a ship, or a space shuttle. Furthermore, the crew rest compartment may also be mounted in facilities where an efficient use of the available space of the facility is required such as in research stations and space stations.

The term "bunk" refers to a bed, a rest or lying area and may comprise a mattress. Moreover, each bunk comprises a sleeping area which is an area to accommodate a sleeping or lying crew member. For example, the sleeping area is designed such that the crew member can lie in the sleeping area with a stretched body. Each bunk may have a rectangular shape or a shape which is adapted to the available space in the crew rest compartment or which shape is adapted to the body dimensions of the crew member. For example, the bunk may have a triangle-like shape, a trapeze-like shape, a rhomboid-like shape or an oval-like shape. Moreover, the sleeping area of each bunk has a longitudinal direction which, for example, is the direction of a maximal extension of the sleeping area.

By defining that the first bunk is located above the second bunk it is specified that the vertical position of the first bunk is higher than the vertical position of the second bunk. Thus, the mattress level of the first bunk is above the mattress level of the second bunk. For example, the first bunk and the second bunk are located in the crew rest compartment such that there is no horizontal offset between the first bunk and the second bunk.

The longitudinal direction of the crew rest compartment is defined by the longitudinal direction of the means of transport when the crew rest compartment is mounted in the means of transport. In other words, the orientation of the crew rest compartment with respect to the longitudinal axis of the means of transport when the crew rest compartment is mounted in the means of transport defines the longitudinal direction of the crew rest compartment. The crew rest compartment is adapted to be mounted with a specific orientation into the means of transport. The longitudinal direction of the means of transport may also refer to the travel direction or the driving direction of the means of transport.

The first bunk is located in the crew rest compartment such that the longitudinal direction of the first bunk and the longitudinal direction of the crew rest compartment enclose an angle which differs from 0° and 90°. In other words, the longitudinal direction of the first bunk is neither parallel nor perpendicular to the longitudinal direction of the crew rest compartment. For example, the longitudinal direction of the first bunk and the longitudinal direction of the crew rest compartment enclose an angle between 9° and 27°, or the longitudinal direction of the first bunk and a transversal direction of the crew rest compartment enclose an angle between 9° and 27° which transversal direction is perpendicular to the longitudinal direction of the crew rest compartment.

For example, the crew rest compartment comprises a changing area for the crew members and/or a storing area adapted for storing a piece of luggage of the crew members.

The advantage of the crew rest compartment according to this embodiment of the invention is that the available space is optimized for the person using it. Thus, this arrangement makes an efficient use of the available space feasible. Moreover, bunks with a rhomboid-like form can have an improved stability.

According to another embodiment of the invention, the first and the second bunk have a maximal offset in a horizontal direction. Said maximal offset is between 20 mm and 200 mm. In other words, the maximal horizontal displacement between the first and the second bunk is between 20 mm and 200 mm.

For example, the lower edges of the crew rest compartment in can be chamfered or slanted due to a roughly circular cross-section of the means of transport in which the crew rest compartment is mounted. Said chamfered or slanted lower edges reduce the available space for the bunks near the floor. Thus, the lower bunks can be shifted to an inside of the crew rest compartment such that the available space for the crew member in the lower bunk is not reduced.

According to a further embodiment of the present invention, each sleeping area has a transversal direction which transversal direction defines a transversal direction of each bunk. Furthermore, the first bunk has a maximal elongation along the longitudinal direction which maximal elongation is not less than 2000 mm, or at least not less than 1950 mm. Moreover, the first bunk has a maximal elongation along the transversal direction not less than 700 mm, or at least not less than 650 mm.

Said maximal elongations along the longitudinal and the transversal direction of the bunk define a minimal size of the bunk such that a crew member with an average size fits into the bunk. In other words, a longitudinal and a transversal elongation of the bunk are defined which define minimal extensions of the bunk.

Each bunk may have a different shape such that the defined maximal elongations along the longitudinal direction and the transversal direction are held. For example, the maximal elongation along the transversal direction, i.e. the maximal width of the bunk, may be in the shoulder area of the lying area. In the foot area, for example, the transversal elongation can be less than 700 mm, for example it is approximately 400 mm. Thus, the shape of each bunk may substantially differ from a rectangular shape.

According to another embodiment of the invention, the crew rest compartment comprises a bunk with a maximal elongation in a longitudinal direction less than 2000 mm, e.g. 1950 mm, and/or with a maximal elongation in a transversal direction less than 700 mm, e.g. 650 mm. The crew rest compartment may also comprise multiple bunks having different elongations in a longitudinal and/or a transversal direction. For example, the crew rest compartment comprises two bunks with a maximal elongation in a longitudinal direction not less than 2000 mm and six bunks with a maximal elongation in a longitudinal direction less than 2000 mm, e.g. 1900 mm.

In a further embodiment of the invention, the vertical distance between the first bunk and the second bunk is not less than 550 mm or not less than 600 mm.

According to another embodiment of the invention, the crew rest compartment further comprises a third, a fourth, a fifth, a sixth, a seventh, and an eighth bunk. Furthermore, the third bunk is located above the fourth bunk, the fifth bunk is located above the sixth bunk, and the seventh bunk is located above the eighth bunk.

Thus, the crew rest compartment comprises eight bunks and is adapted for accommodating up to eight sleeping crew members at the same time.

According to another embodiment of the invention, a symmetry plane divides the crew rest compartment into a first portion and a second portion. Said symmetry plane is spanned by the longitudinal direction of the crew rest compartment and by a vertical direction. Furthermore, the first portion of the crew rest compartment comprises the first to fourth bunk.

Thus, when the crew rest compartment is mounted in the means of transport, for example in an aircraft fuselage, the symmetry plane extends along the fuselage from a top to a bottom of the fuselage and divides the fuselage and the crew rest compartment in a left half and a right half.

According to a further embodiment of the invention, the longitudinal direction of the first bunk and the longitudinal direction of the crew rest compartment enclose an angle between 9° and 27°. Furthermore, the longitudinal direction of the third bunk and a transversal direction of the crew rest compartment enclose an angle between 9° and 27°. Said transversal direction of the crew rest compartment is perpendicular to the longitudinal direction of the crew rest compartment.

For example, the first bunk is located above the second bunk without any offset in a horizontal direction. However, there may also be an offset in a horizontal direction between the first bunk and the second bunk. For example, the maximal offset in a horizontal direction is between 20 mm and 200 mm. The same also applies to the third and fourth bunk, the fifth and sixth bunk, as well as to the seventh and eighth bunk.

According to a further embodiment of the invention, the second portion of the crew rest compartment comprises the fifth to eighth bunk. Furthermore, the fifth to eighth bunks are arranged in a mirror symmetry with respect to the symmetry plane.

Thus, the crew rest compartment according to this embodiment of the invention has a minor symmetrical arrangement of the first to eighth bunk.

According to a further embodiment of the present invention, the longitudinal direction of the fifth bunk is substantially parallel to the longitudinal direction of the crew rest compartment and the longitudinal direction of the seventh bunk is parallel to the transversal direction of the crew rest compartment.

Consequently, the crew rest compartment comprises bunks which are neither parallel nor perpendicular to the longitudinal direction of the crew rest compartment as well as bunks which are either aligned parallel or perpendicular to the longitudinal direction of the crew rest compartment.

According to a further embodiment of the invention, the longitudinal direction of the first bunk and the longitudinal direction of the crew rest compartment enclose an angle between 9° and 27°. Furthermore, the longitudinal direction of the third bunk and the longitudinal direction of the crew rest compartment enclose an angle between 9° and 27°. Moreover, the longitudinal direction of the fifth bunk and the longitudinal direction of the crew rest compartment enclose an angle between 9° and 27°. In addition, the longitudinal direction of the seventh bunk is substantially parallel to the second direction of the crew rest compartment.

According to another embodiment of the invention, the crew rest compartment is designed for being located in a lower deck of a means of transport.

For example, the crew rest compartment is designed for being mounted in a lower deck of an aircraft fuselage, for example in a cargo compartment. For example, it is located between the E-Bay and the aft lower deck of the aircraft fuselage.

According to another embodiment of the invention, the crew rest compartment comprises a first opening in a ceiling area of the crew rest compartment, wherein the first opening is designed for providing an access from and/or to an upper deck of the means of transport.

For example, the crew rest compartment is located in a lower deck of an aircraft and the first opening is adapted for providing an access from and/or to an upper deck of the aircraft, e.g. for providing an access from a cockpit of the aircraft. The access may be given by means of a ladder or a staircase. Thus, a ladder or staircase is located between the floor of the crew rest compartment and the first opening of the crew rest compartment.

According to another embodiment of the invention, the crew rest compartment comprises a second and a third opening in the means of transport.

For example, if the crew rest compartment is located in a cargo compartment of an aircraft, the second opening may be designed for providing an access to an E-Bay of the aircraft and the third opening may be designed for providing an access to an aft cargo compartment or to a further crew rest compartment of the aircraft.

According to a further embodiment of the invention, the crew rest compartment comprises a rectangular base area, wherein two parallel sides of the rectangular base area define the longitudinal direction of the crew rest compartment.

In other words, the crew rest compartment has a rectangular horizontal cross-section. Thus, one side of the crew rest compartment may be larger than a second side which is perpendicular to the first side. Furthermore, the crew rest compartment may also have a quadratic base area with sides of equal length.

In particular, the crew rest compartment may be shaped as a cargo container with a longitudinal side length of 2400 mm, a transversal side length of 4040 mm and a maximal vertical elongation of 1570 mm. Furthermore, the crew rest compartment with the shape of a cargo container may comprise two chamfered or slanted lower edges.

According to a further embodiment of the invention, a means of transport comprising a crew rest compartment is provided.

The means of transport may be an aircraft, a ship, a train, a bus, a submarine, or a space shuttle.

Exemplary embodiments of the invention will be described in the following drawings. Any reference signs in the claims should not be construed as limiting the scope of the claims.

DETAILED DESCRIPTION

Figure 1:
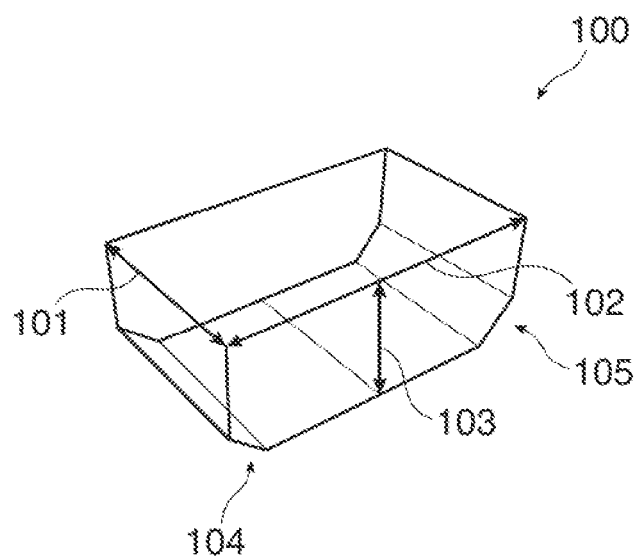
FIG. 1 shows a cargo container according to an exemplary embodiment of the invention.
Figure 2:
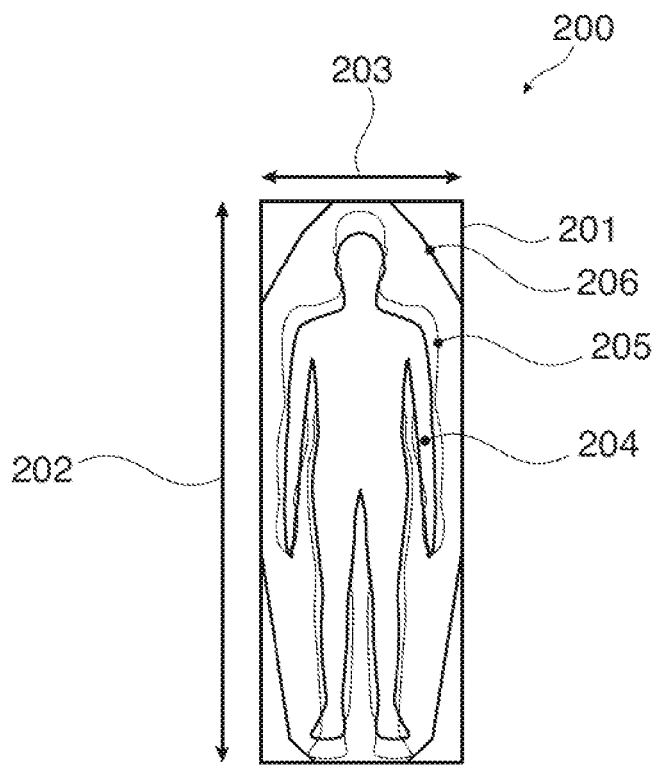
FIG. 2 is a schematic top view of a bunk according to an exemplary embodiment of the invention.

FIG. 1 depicts a cargo container 100 for being mounted in a cargo compartment of an aircraft 1700. The container comprises a size 101 in a longitudinal direction, a size 102 in a transversal direction, and a size 103 in a vertical direction. For example, the longitudinal direction refers to the longitudinal direction of the means of transport when the container is mounted in the means of transport. Moreover, the container may comprise chamfered lower edges 104 and 105 for being mounted in a lower deck of a circular means of transport. For example, the cargo container has a longitudinal side length of 2400 mm, a transversal side length of 4040 mm, and a maximal vertical elongation of 1570 mm FIG. 2 shows a bunk or a lying area 200 according to an exemplary embodiment of the invention. That bunk 200 is adapted for accommodating a crew member 410. With the reference sign 204 a crew member 411 with a body length of 1800 mm is shown and with the reference sign 205 a crew member with a body length of 1950 mm is shown. Thus, the bunk has enough space for accommodating a crew member with a body length of 1950 mm. The bunk 200 comprises a sleeping area 206 which is adapted to accommodate a sleeping crew member 411.

The bunk may have a rectangular shape 201 or a different shape which is adapted to the shape of the sleeping area 206 and/or to the available space of the crew rest compartment 300. In order to guarantee that a crew member 411 fits into the bunk, said bunk 200 comprises a maximal dimension in a longitudinal direction 202 which is not smaller than 2000 mm. Furthermore, the bunk 200 comprises a maximal dimension in a transversal direction 203 which is not smaller than 700 mm.

Figure 3:
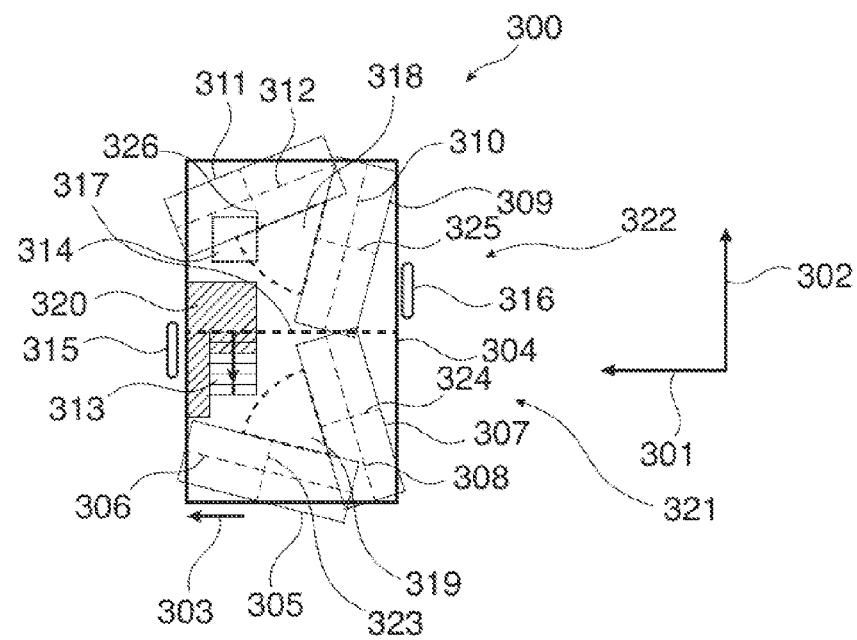
FIG. 3 is a schematic cross-section of a crew rest compartment according to an exemplary embodiment of the invention.
Figure 4:
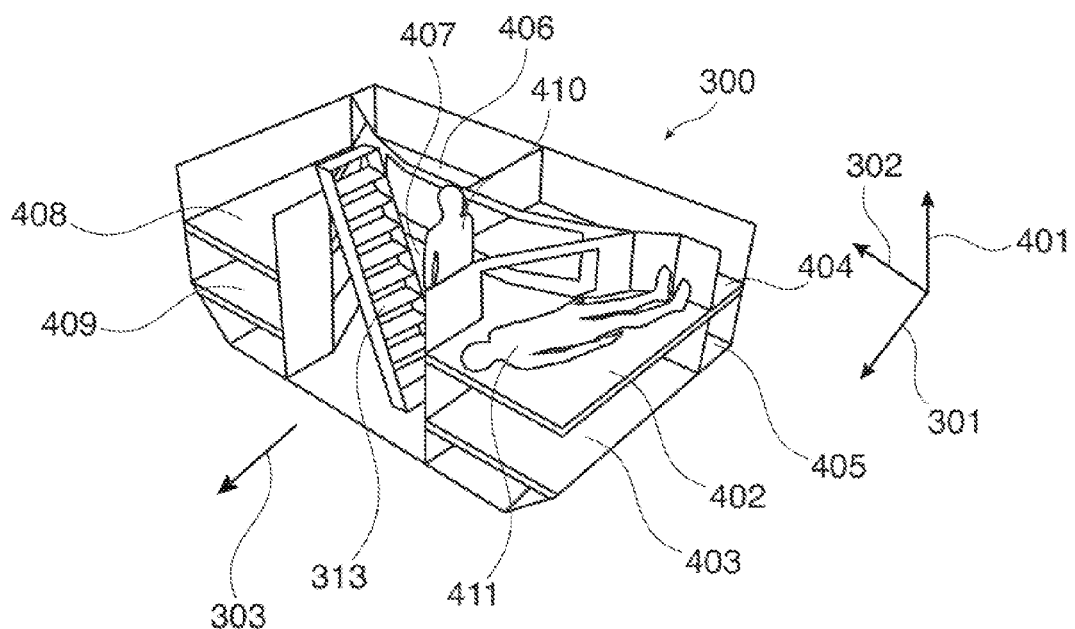
FIG. 4 is a schematic drawing of a crew rest compartment according to an exemplary embodiment of the invention.
Figure 5:
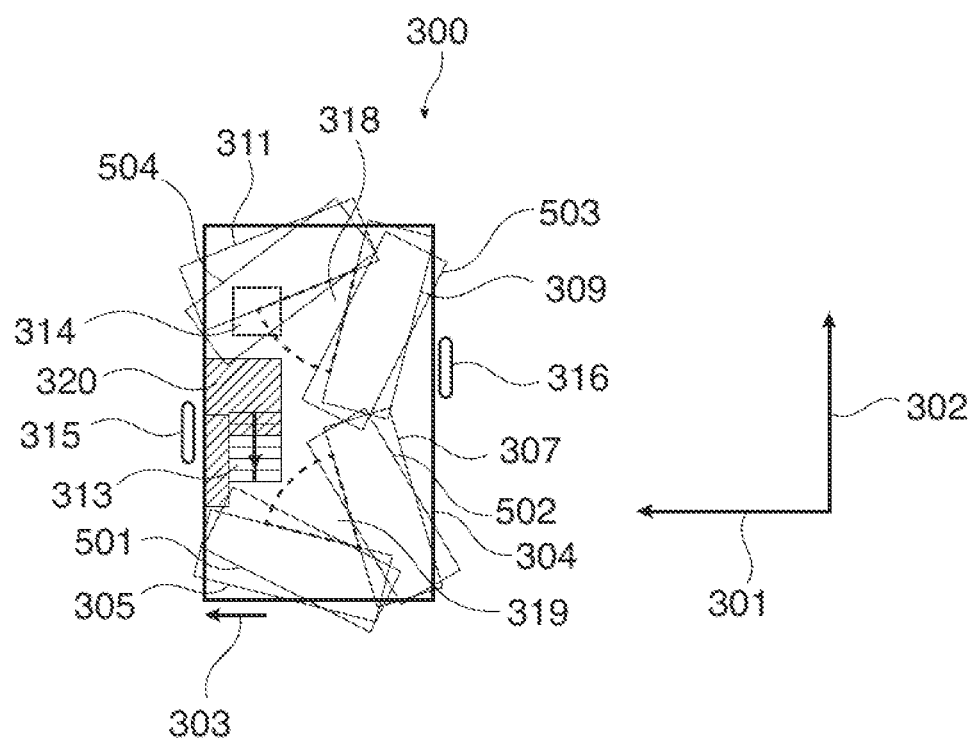
FIG. 5 is a schematic cross-section of a crew rest compartment according to an exemplary embodiment of the invention.
Figure 6:
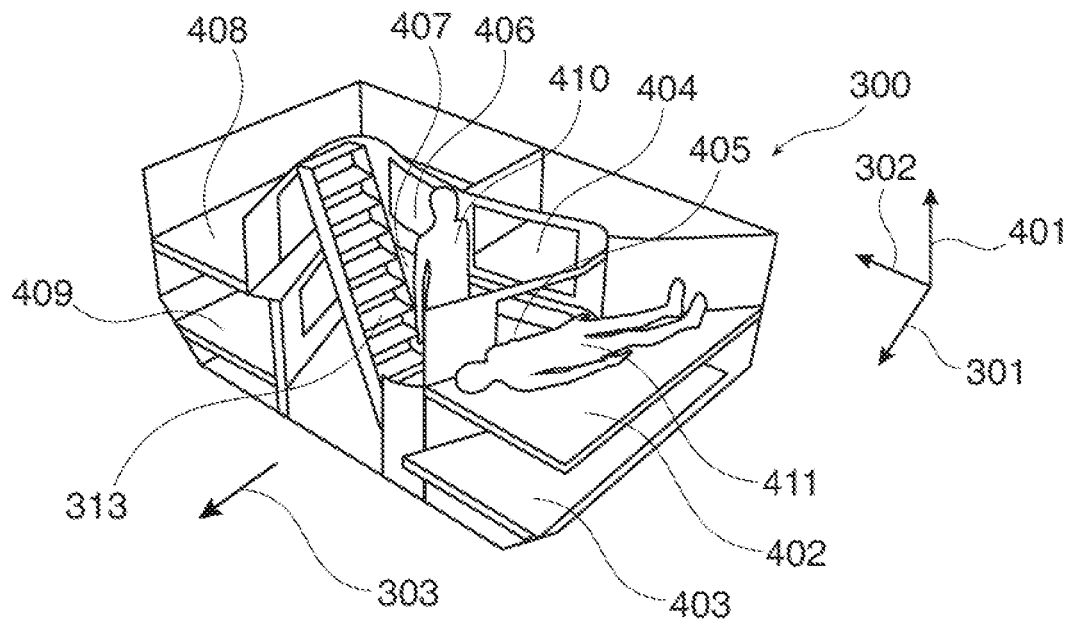
FIG. 6 is a schematic drawing of a crew rest compartment according to an exemplary embodiment of the invention.
Figure 7:
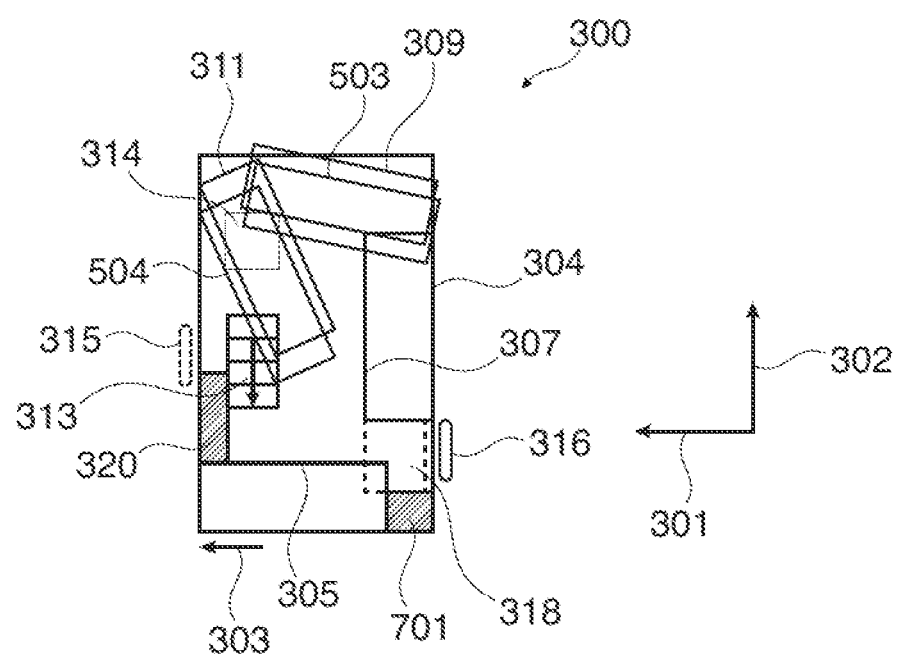
FIG. 7 is a schematic cross-section of a crew rest compartment according to an exemplary embodiment of the invention.
Figure 8:
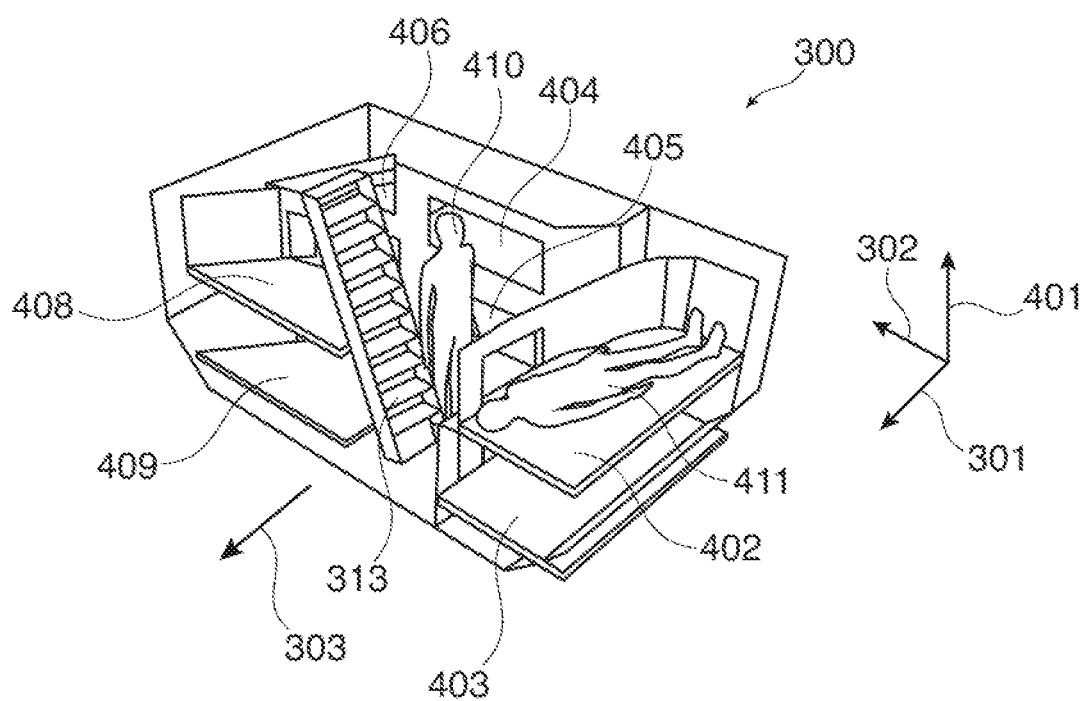
FIG. 8 is a schematic drawing of a crew rest compartment according to an exemplary embodiment of the invention.
Figure 9:
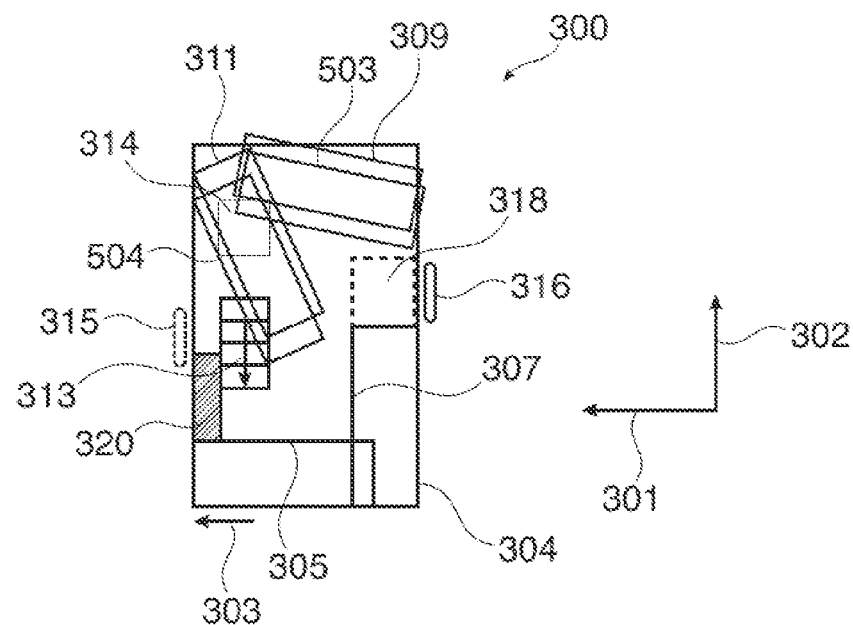
FIG. 9 is a schematic cross-section of a crew rest compartment according to an exemplary embodiment of the invention.
Figure 10:
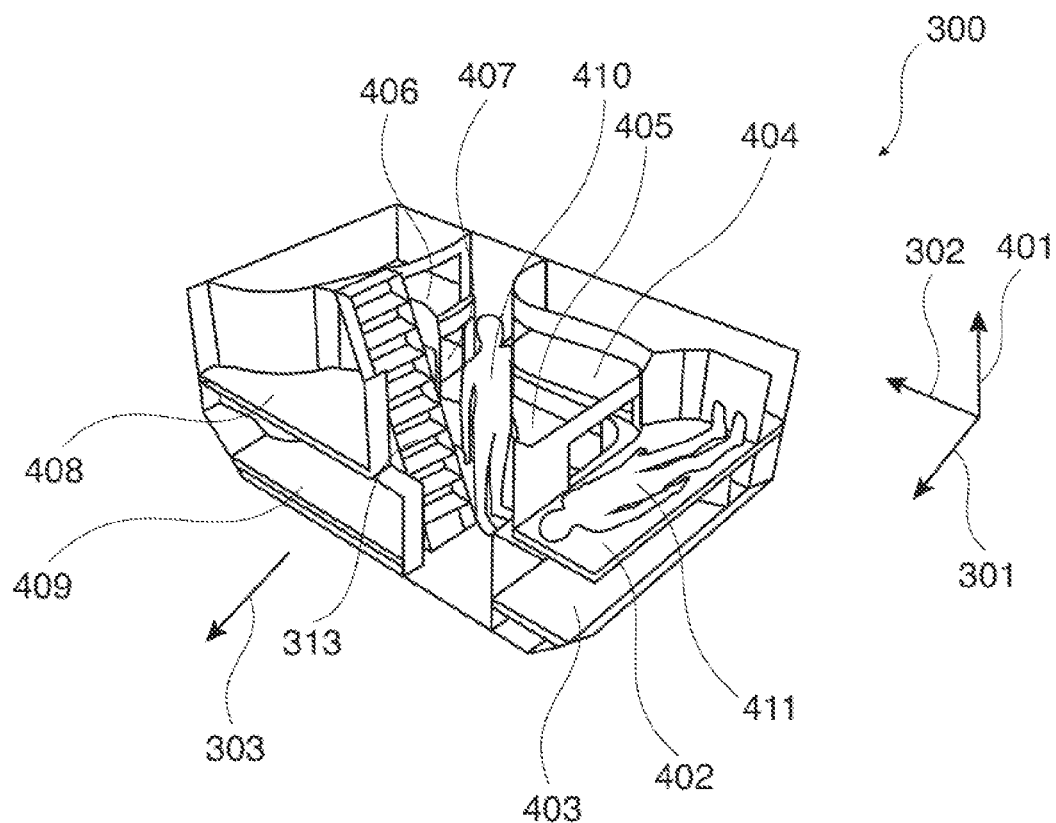
FIG. 10 is a schematic drawing of a crew rest compartment according to an exemplary embodiment of the invention.
Figure 11:
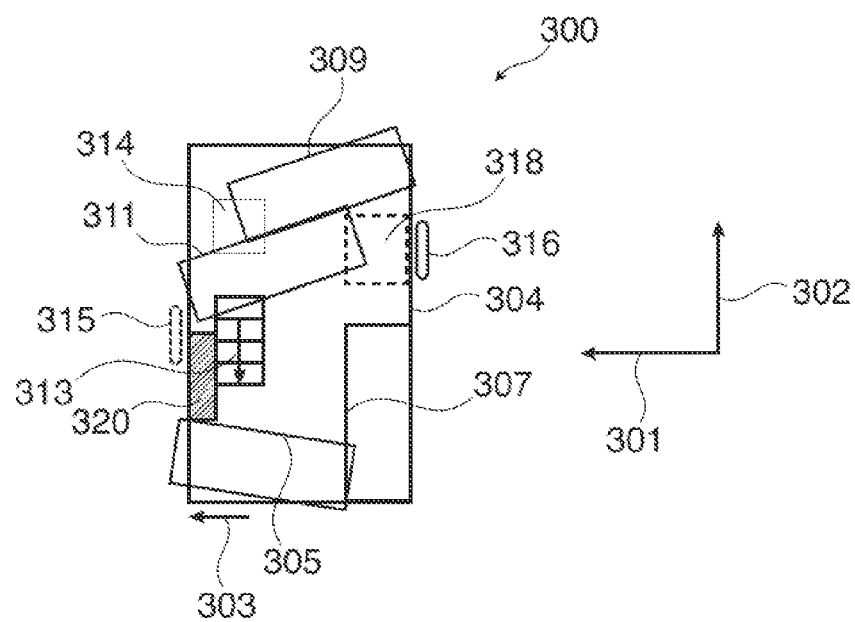
FIG. 11 is a schematic cross-section of a crew rest compartment according to an exemplary embodiment of the invention.
Figure 12:
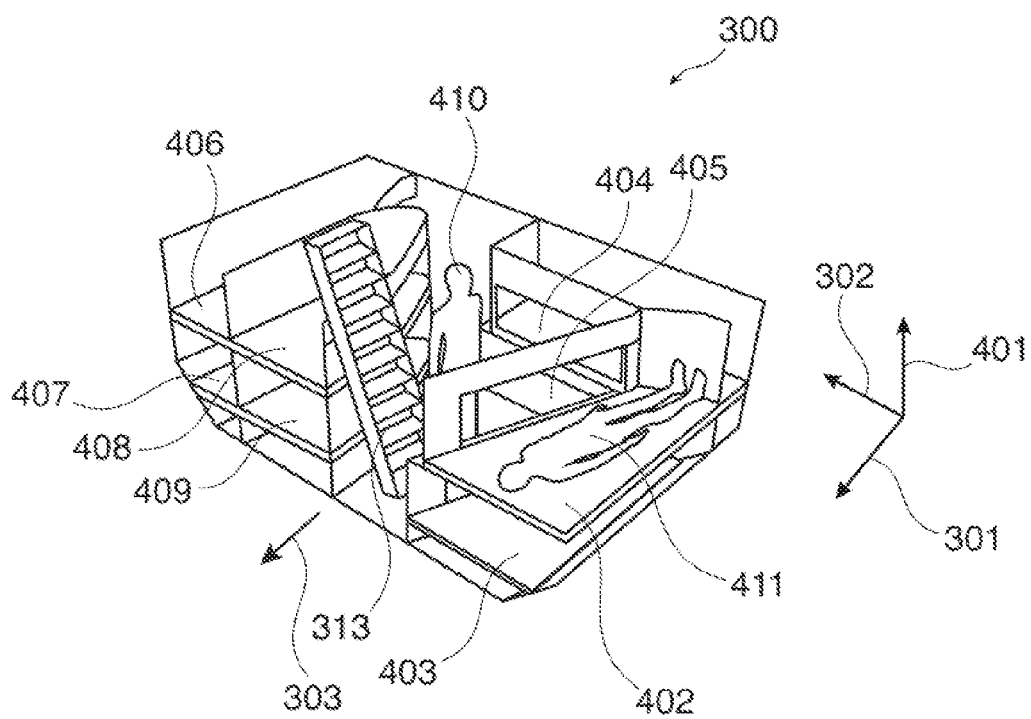
FIG. 12 is a schematic drawing of a crew rest compartment according to an exemplary embodiment of the invention.

FIG. 3 to FIG. 12 show different arrangements of bunks into a respective crew rest compartment 300 according to five different exemplary embodiments of the invention. FIG. 3 and FIG. 4 show a schematic cross section and a schematic three dimensional illustration of a crew rest compartment according to a first exemplary embodiment. Equally, FIG. 5 and FIG. 6 show a crew rest compartment according to a second exemplary embodiment of the invention, FIG. 7 and FIG. 8 show a crew rest compartment according to a third exemplary embodiment of the invention, FIG. 9 and FIG. 10 show a crew rest compartment according to a fourth exemplary embodiment of the invention, and FIG. 11 and FIG. 12 show a crew rest compartment according to a fifth exemplary embodiment of the invention.

FIG. 3 shows a schematic horizontal cross-section of a crew rest compartment 300 according to a first exemplary embodiment of the invention. The crew rest compartment 300 is adapted for being mounted in a means of transport 1700 such that the direction 301 is parallel to the travel direction 303 of the means of transport 1700. Thus, the direction 301 is referred to as the longitudinal direction of the crew rest compartment. The direction 302 is perpendicular to the longitudinal direction of the crew rest compartment 301 and is referred to as the transversal direction of the crew rest compartment. According to the exemplary embodiments presented, the crew rest compartment 300 has a rectangular shape.

The crew rest compartment 300 comprises eight bunks. In FIG. 3, a first bunk 305, a third bunk 307, a fifth bunk 309, and a seventh bunk 311 are shown. The second, fourth, sixth, and eighth bunk are not shown since they are located exactly below the first, third, fifth, and seventh bunk, respectively. In this cross-sectional view the bunks are shown with a rectangular shape. However, it can be gathered that the bunks do not fit completely into the crew rest compartment 300. Therefore, the shape of each bunk is adapted such that they fit into the available space of the crew rest compartment 300 and such that a crew member 411 fits into each bunk 200 as can be gathered in FIG. 4. For the first bunk 305, a longitudinal direction 306 is indicated. Equally, the third bunk 307 comprises a longitudinal direction 308, the fifth bunk 309 comprises a longitudinal direction 310, and the seventh bunk comprises a longitudinal direction 312. Moreover, the first bunk 305 has a transversal direction 323, the third bunk 307 has a transversal direction 324, the fifth bunk 309 has a transversal direction 325, and the seventh bunk 311 has a transversal direction 326. In the following figures showing the second to fifth exemplary embodiments the longitudinal and transversal directions of the bunks are not shown anymore in order not to overload the figures.

The bunks are arranged in the crew rest compartment 300 such that the longitudinal direction of the first bunk 306 and the longitudinal direction of the crew rest compartment 301 enclose an angle which is neither 0° nor 90°. In other words, the longitudinal direction of the first bunk 306 and the longitudinal direction of the crew rest compartment are neither parallel nor perpendicular. The same applies to the longitudinal directions of the third, fifth, and seventh bunk 308, 310, and 312, respectively. In particular, the longitudinal direction of the first bunk 306 and the longitudinal direction of the crew rest compartment 301 enclose an angle between 9° and 27°. Equally, the longitudinal direction of the seventh bunk 312 and the longitudinal direction of the crew rest compartment also enclose an angle between 9° and 27°. The longitudinal direction of the third bunk 308 and the transversal direction of the crew rest compartment 302 enclose an angle between 9° and 27° as well as the longitudinal direction of the fifth bunk 310 and the transversal direction of the crew rest compartment 302. Moreover, the crew rest compartment 300 comprises a symmetry plane 317 which is spanned by the longitudinal direction of the crew rest compartment 301 and by a vertical direction of the crew rest compartment 401 separating the crew rest compartment 300 into a first portion 321 and a second portion 322. In this exemplary embodiment, the bunks are arranged in the crew rest compartment 300 in a mere symmetrical way with respect to the symmetry plane 317.

In order to provide an access to and/or from an upper area of the means of transport 1700, the crew rest compartment 300 comprises an upper first opening 314 located in a ceiling area of the crew rest compartment. Therefore, the crew rest compartment 300 comprises a ladder or a staircase 313 located between the floor of the crew rest compartment and the first opening 314 in the ceiling area of the crew rest compartment. Furthermore, the crew rest compartment 300 comprises a second opening 315 for providing an access to a front area of the means of transport 1700 and an opening 316 for providing an access to an aft area of the means of transport 1700. As can be seen in FIG. 3, the third to sixth bunk may block the way to the third opening 316. Thus, the third to sixth bunk may comprise a mechanism to rotate or shift the bunks such that a gap is created providing an access to the third opening 316.

Moreover, the crew rest compartment 300 comprises two changing areas 318 and 319 which provide enough space for a crew member 410 to change its clothes. Moreover, the crew rest compartment 300 may also comprise a storage area 320 to store the luggage of the crew members.

FIG. 4 shows a three-dimensional schematic illustration of the crew rest compartment according to the first exemplary embodiment of the invention. In addition to the longitudinal direction of the crew rest compartment 301 and the transversal direction of the crew rest compartment 302, a vertical direction of the crew rest compartment 401 is indicated.

Furthermore, a first bunk 402, a second bunk 403, a third bunk 404, a fourth bunk 405, a fifth bunk 406, a sixth bunk 407, a seventh bunk 408, and an eighth bunk 409. All eight bunks have a shape which is not rectangular but which shape is adapted to the available space of the crew rest compartment 300 and to the size of the crew member 411. Moreover, the crew member 411 is shown to be lying with a stretched body in the first bunk 402. A second crew member 410 is shown to be standing in the changing area 319. The ladder or staircase 313 provides an access to an upper area of the means of transport 1700 through the opening 314 is shown. In addition, it is also shown that the bunks have sidewalls with openings providing an access to each bunk.

Regarding FIGS. 5 to 12 showing second to fifth exemplary embodiments according to the invention, only the features which differ from the first exemplary embodiment will be described. The features which are not described in FIGS. 5 to 12 are already described in FIGS. 3 and 4. For these features, it is therefore referred back to the description of FIGS. 3 and 4.

FIGS. 5 and 6 show a crew rest compartment 300 according to a second exemplary embodiment of the invention. The crew rest compartment comprises a first bunk 305, a second bunk 501, a third bunk 307, a fourth bunk 502, a fifth bunk 309, a sixth bunk 503, a seventh bunk 311, and an eighth bunk 504. In this second exemplary embodiment, all eight bunks are visible in the horizontal cross section shown in FIG. 5 since the first bunk 305, the third bunk 307, the fifth bunk 309, and the seventh bunk 311 are not located exactly above the second bunk 501, the fourth bunk 502, the sixth bunk 503, and the eighth bunk 504. Thus, the upper and lower bunks have a horizontal displacement, i.e. they are staggered. This horizontal displacement of the lower bunks guarantees that also the lower bunks provide enough space for a crew member 411 despite the chamfered lower edges 104 and 105 of the crew rest compartment 300.

FIGS. 7 and 8 show a crew rest compartment 300 according to a third exemplary embodiment of the invention. In this third exemplary embodiment, the first bunk 305 and the third bunk 307 are located exactly above the second bunk and the fourth bunk. Therefore, only the first bunk 305 and the third bunk 307 are shown in the cross-section of FIG. 7. The fifth bunk 309 and the sixth bunk 503 are aligned such that the angle between longitudinal direction of the fifth and sixth bunk and the longitudinal direction of the crew rest compartment 301 enclose an angle which is between 9° and 27°. Moreover, the fifth bunk 309 and the sixth bunk 503 are horizontally displaced or staggered such that the sixth bunk 503 is located more on the inside of the crew rest compartment 300. Equally, the seventh bunk 311 and the eighth bunk 504 are aligned such that the longitudinal direction of the seventh and eighth bunk and the transversal direction of the crew rest compartment 302 enclose an angle between 9° and 27°.

The third opening 316 is located between the first bunk 305 and the third bunk 307. Moreover, there is a gap between the first bunk 305 and the third bunk 307 providing an access to the third opening 316. Moreover, the changing area 318 is located between the first bunk 305 and the third bunk 307. A storing area 701 is located next to the changing area.

In the three-dimensional illustration of FIG. 8, the sixth bunk is not shown since it is hidden behind the ladder or staircase 313.

FIG. 9 and FIG. 10 show a crew rest compartment 300 according to a fourth exemplary embodiment of the present invention. The bunks of the crew rest compartment of FIG. 9 have the same angular alignment to the longitudinal direction of the crew rest compartment 301 as in the crew rest compartment 300 of according to the third exemplary embodiment of the invention shown in FIGS. 7 and 8. In contrast to the crew rest compartment 300 according to the third exemplary embodiment of the invention, the third opening 316 is located between the third bunk 307 and the fifth bunk 309. Equally, the changing area 318 is located between the third bunk 307 and the fifth bunk 309. This gap between the third bunk and the fifth bunk is also shown in the three-dimensional illustration shown in FIG. 10.

FIG. 11 and FIG. 12 show a crew rest compartment 300 according to a fifth exemplary embodiment of the invention. In this fifth exemplary embodiment, the first bunk 305, the third bunk 307, the fifth bunk 309, and the seventh bunk 311 are located exactly above the second bunk, the fourth bunk, the sixth bunk, and the eighth bunk. Thus, the second bunk, the fourth bunk, the sixth bunk, and the eighth bunk are not shown in the cross-section depicted in FIG. 11. Furthermore, the first bunk is aligned, such that the longitudinal direction of the first bunk 305 is not parallel to the longitudinal direction of the crew rest compartment 301, for example the longitudinal direction of the first bunk 305 and the longitudinal direction of the crew rest compartment 301 enclose an angle between 9° and 27°. The second bunk 307 is aligned such that the longitudinal direction of the second bunk 307 is parallel to the transversal direction of the crew rest compartment 302. Furthermore, the fifth bunk 309 and the seventh bunk 311 are aligned such that the longitudinal direction of the fifth bunk 309 and the longitudinal direction of the seventh bunk 311 are parallel. Moreover, the longitudinal direction of the fifth bunk 309 and the longitudinal direction of the seventh bunk 311 are not parallel to the longitudinal direction of the crew rest compartment 301. For example, the longitudinal direction of the fifth bunk 309 and the longitudinal direction of the crew rest compartment 301 enclose an angle between 9° and 27°. In addition, the longitudinal direction of the first bunk 305 is rotated in a different direction with respect to the longitudinal direction of the crew rest compartment 301 than the fifth bunk 309 and the seventh bunk 311.

The third opening 316 is located between the third bunk and the fifth bunk. Moreover, also the changing area 318 is located between the third bunk and the fifth bunk.

Figure 13:
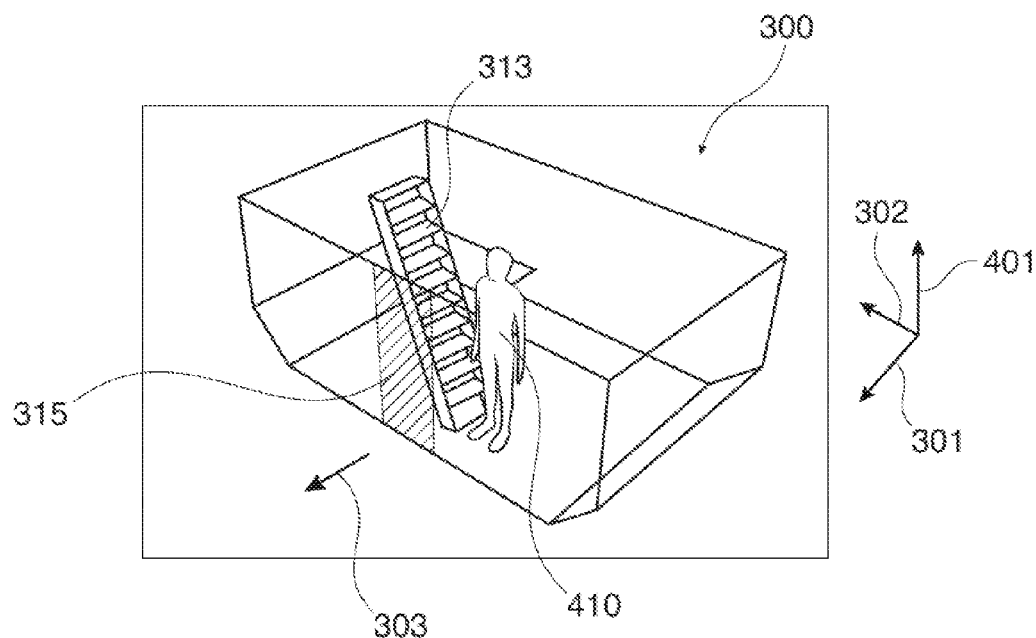
FIG. 13 is a schematic drawing of a crew rest compartment according to an exemplary embodiment of the invention.

In the exemplary embodiments of the present invention of FIGS. 3 to 12, the ladder or staircase 313 is located in front of the second opening 315 and may prevent an access to the second opening 315 as shown in FIG. 13 according to an exemplary embodiment of the invention. Thus, when a crew member wants to access the second opening 315, the ladder or staircase 313 has to be moved in some way.

Figures 14, 15, 16:
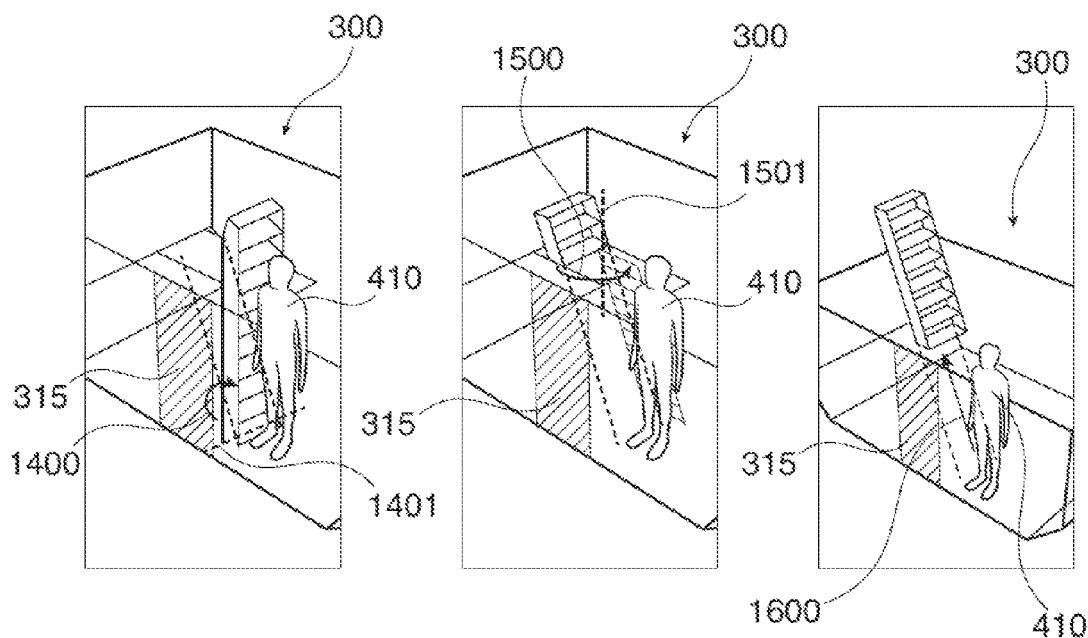
FIG. 14 is a schematic drawing of a crew rest compartment according to an exemplary embodiment of the invention.
FIG. 15 is a schematic drawing of a crew rest compartment according to an exemplary embodiment of the invention.
FIG. 16 is a schematic drawing of a crew rest compartment according to an exemplary embodiment of the invention.

FIG. 14 to FIG. 16 show different possibilities of moving the ladder or staircase 313.

FIG. 14 shows the possibility of rotating the ladder or staircase 313 around the axis 1401 according to an exemplary embodiment of the invention. The rotating movement of the ladder or staircase 313 is indicated by the arrow 1400.

FIG. 15 shows the possibility to rotate the ladder or staircase 313 according to another exemplary embodiment of the invention. In this exemplary embodiment it is shown that a part of the ladder or staircase 313 is rotated around the axis 1501 and the movement of the part of the ladder or staircase 313 is indicated by the arrow 1500.

FIG. 16 depicts a possibility to slide the staircase or ladder 313 according to an exemplary embodiment of the invention. In particular, a part of the ladder or staircase 313 is shifted into an upper area indicated by the arrow 1600.

Figure 17:
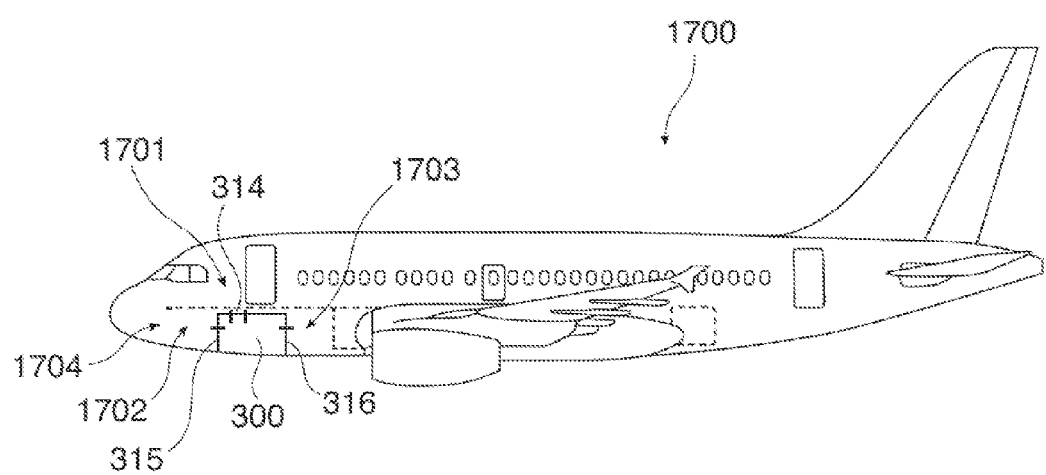
FIG. 17 is a schematic side view of a means of transport according to an exemplary embodiment of the invention.

FIG. 17 shows a means of transport 1700, for example an airplane 1700. The airplane 1700 comprises an upper deck 1701 and a lower deck 1704. The crew rest compartment 300 is located in the lower deck 1704, e.g. in a cargo area of the airplane. In the front of the crew rest compartment 1702 for example the E-Bay of the airplane 1700 is located and in the back of the crew rest compartment 300 the aft cargo compartment 1703 is located. Thus, the opening 314 of the crew rest compartment 300 provides an access to the upper area 1701. The opening 315 provides an access to the front area 1702 and the third opening 316 provides an access to the back area 1703 of the airplane 1700.

Whilst the invention has been illustrated and described in detail in the drawings and in the above description, such illustrations and descriptions are intended to be merely illustrative or examples are non-restrictive, so that the invention is not restricted by the disclosed embodiments. Other variations of the disclosed embodiments can be understood and accomplished by a person skilled in the art by implementing the claimed invention from a study of the drawings, from the disclosure and from the appended claims.

In the claims, the word "comprising" does not exclude other members or steps and the indefinite article "a" does not exclude a plurality.

The mere fact that particular features or elements are specified in different dependent claims or embodiments does not restrict the subject-matter of the invention. Any combination of said features or embodiments may also be used advantageously.

The invention claimed is:

1. A means of transport comprising:
    a cargo area;
    a cargo container located in the cargo area, wherein a crew rest compartment is arranged in the cargo container and the cargo container is delimited by sidewalls;
    the crew rest compartment comprising:
    a first bunk and a second bunk, the first bunk and the second bunk each comprising a sleeping area adapted for accommodating a sleeping member of a crew;
    a floor;
    wherein the first bunk and the second bunk are located above the floor and the first bunk and the second bunk are both accessible from the floor;
    wherein each sleeping area has a longitudinal direction which defines a longitudinal direction of the corresponding bunk;
    wherein the first bunk is located above the second bunk; and
    wherein the longitudinal direction of the first bunk and a longitudinal direction of the crew rest compartment enclose an angle which differs from 0° and 90°, the longitudinal direction of the crew rest compartment being parallel to the longitudinal direction of the means of transport when the crew rest compartment is mounted in the means of transport; and
    wherein the longitudinal direction of the first bunk is oblique to each of the sidewalls of the cargo container.

2. The means of transport according to claim 1, wherein the first bunk and the second bunk have a maximal offset in a horizontal direction between 20 mm and 200 mm.

3. The means of transport according to claim 1,
    wherein each sleeping area has a transversal direction defining a transversal direction of the corresponding bunk;
    wherein the first bunk comprises a maximal elongation along the longitudinal direction not less than 2000 mm; and
    wherein the first bunk comprises a maximal elongation along the transversal direction not less than 700 mm.

4. The means of transport according to claim 1, further comprising:
    a third bunk, a fourth bunk, a fifth bunk, a sixth bunk, a seventh bunk, and an eighth bunk;

wherein the third bunk is located above the fourth bunk, the fifth bunk is located above the sixth bunk, and the seventh bunk is located above the eighth bunk.

5. The means of transport according to claim 4,
wherein a symmetry plane divides the crew rest compartment into a first portion and a second portion, the symmetry plane being spanned by the longitudinal direction of the crew rest compartment and by a vertical direction; and
wherein the first portion of the crew rest compartment comprises the first bunk, the second bunk, the third bunk, and the fourth bunk.

6. The means of transport according to claim 5,
wherein the second portion of the crew rest compartment comprises the fifth bunk, the sixth bunk, the seventh bunk, and the eighth bunk; and
wherein the fifth bunk, the sixth bunk, the seventh bunk, and the eighth bunk are arranged in mirror symmetry to the first bunk, the second bunk, the third bunk, and the fourth bunk with respect to the symmetry plane.

7. The means of transport according to claim 4,
wherein the longitudinal direction of the first bunk and the longitudinal direction of the crew rest compartment enclose an angle between 9° and 27°; and
wherein a longitudinal direction of the third bunk and a transversal direction of the crew rest compartment enclose an angle between 9° and 27°, the transversal direction of the crew rest compartment being perpendicular to the longitudinal direction of the crew rest compartment.

8. The means of transport according to claim 4,
wherein a longitudinal direction of the fifth bunk is substantially parallel to the longitudinal direction of the crew rest compartment; and
wherein a longitudinal direction of the seventh bunk is substantially parallel to the transversal direction of the crew rest compartment.

9. The means of transport according to claim 4,
wherein the longitudinal direction of the first bunk and the longitudinal direction of the crew rest compartment enclose an angle between 9° and 27°;
wherein a longitudinal direction of the third bunk is substantially parallel to the transversal direction of the crew rest compartment;
wherein a longitudinal direction of the fifth bunk and the longitudinal direction of the crew rest compartment enclose an angle between 9° and 27°; and
wherein a longitudinal direction of the seventh bunk and a longitudinal direction of the crew rest compartment enclose an angle between 9° and 27°.

10. The means of transport according to claim 1, wherein the crew rest compartment is configured for being located in a lower deck of the means of transport.

11. The means of transport according to claim 1,
wherein the crew rest compartment comprises a first opening in a ceiling area of the crew rest compartment; and
wherein the first opening is configured for providing an access from an upper deck of the means of transport.

12. The means of transport according to claim 11,
wherein the crew rest compartment comprises a second opening and a third opening; and
wherein each of the second opening and the third opening are configured for providing an access to an adjacent space in the means of transport.

13. The means of transport according to claim 1,
wherein the crew rest compartment comprises a rectangular base area; and
wherein one side of the rectangular base area defines the longitudinal direction of the crew rest compartment.

14. The means of transport according to claim 1, further comprising a third bunk disposed at height above the floor and oriented at an oblique angle relative to the first bunk and relative to each of the sidewalls of the cargo container.

15. The means of transport according to claim 14, wherein the first bunk is positioned adjacent to a first sidewall and the third bunk is positioned adjacent to a second sidewall, the first and second sidewalls intersecting each other.

16. The means of transport according to claim 15, wherein the third bunk is located at the same height above the floor as the first bunk.

17. The means of transport according to claim 15, further comprising a fourth bunk positioned adjacent the second sidewall and being oriented at an oblique angle relative to the third bunk and each of the sidewalls of the cargo container.

18. The means of transport according to claim 17, further comprising a fifth bunk positioned adjacent a third sidewall and being oriented at an oblique angle relative to the fourth bunk and each of the sidewalls of the cargo container, the third sidewall intersecting the second sidewall.

19. The means of transport according to claim 18, wherein the first and third sidewalls are parallel to each other and are each perpendicular relative to the second sidewall.

\* \* \* \* \*